United States Patent [19]

Kammeraad et al.

[11] Patent Number: 5,704,383
[45] Date of Patent: Jan. 6, 1998

[54] TOOL AND METHOD FOR REMOVING FLUID FROM CONTAINER

[75] Inventors: David A. Kammeraad, Holland; Jack C. Canon, Howell; Dwain L. Kamphuis, West Olive, all of Mich.

[73] Assignee: K-Line Industries, Inc., Holland, Mich.

[21] Appl. No.: 274,894

[22] Filed: Jul. 14, 1994

[51] Int. Cl.[6] .............................. B65B 3/04; F01M 11/04
[52] U.S. Cl. .................. 137/15; 123/196 R; 123/196 A; 137/318; 137/322; 141/65; 141/98; 141/330; 184/1.5; 210/248; 210/416.5; 222/91; 222/559; 251/149.4; 251/149.6; 408/226; 408/227
[58] Field of Search .......................... 137/15, 315, 317, 137/318, 322, 544, 547, 549, 550; 7/100, 142, 158, 170; 81/3.08, 3.2, 3.45; 123/196 R, 196 A, 196 S; 141/65, 98, 329, 330, 346, 383; 184/1.5; 210/248, 416.5; 251/149.4, 149.5, 149.6, 149.7, 149.8; 222/91, 544, 559; 408/226, 227

[56] References Cited

U.S. PATENT DOCUMENTS

| | | | |
|---|---|---|---|
| 918,117 | 4/1909 | Blackwell | 137/318 |
| 1,169,691 | 1/1916 | Elmo | 137/318 |
| 1,248,251 | 11/1917 | Breaux | 222/81 |
| 1,992,320 | 2/1935 | Maggenti | 222/91 |
| 2,414,911 | 1/1947 | Temple | 137/318 |
| 3,162,211 | 12/1964 | Barusch | 137/318 |
| 3,509,905 | 5/1970 | Mullins | 137/318 |
| 3,648,725 | 3/1972 | Strybel | 137/318 |
| 3,661,169 | 5/1972 | Mullins | 137/318 |
| 3,788,345 | 1/1974 | Tura | 137/318 |
| 3,799,182 | 3/1974 | Long | 137/318 |
| 3,991,854 | 11/1976 | Tilley | 184/1.5 |
| 4,046,013 | 9/1977 | Green | 137/318 |
| 4,071,012 | 1/1978 | Cooke | 141/98 |
| 4,177,529 | 12/1979 | Sikula, Jr. | 7/100 |

(List continued on next page.)

OTHER PUBLICATIONS

Exhibit A includes photographs taken of a video published by Shell Oil Company in 1994. The video descibes a process and apparatus promoted by Shell Oil Company for removing used engine oil from a vehicle by vacuum to a used oil tank, and then refilling the engine with oil from a "new oil" tank, the new oil being supplied under pressure.

Exhibit B is a sales brochure/newsletter entitled "Oil Bank®" published by Shell Oil Company in 1994, disclosing and promoting the Oil Bank process and apparatus discussed in Exhibit A.

Exhibit C is a product brochure entitled "FEMCO Drain Plug", publication date unknown, disclosing a valve configured for attachment to a threaded drain plug hole in a vehicle oil pan.

The valve identified as item 2 includes an internal, spring–biased piston valve, and a dust cap.

*Primary Examiner*—George L. Walton
*Attorney, Agent, or Firm*—Price, Heneveld, Cooper, DeWitt & Litton

[57] ABSTRACT

A tool for tapping a container and removing fluid from the container includes a modified bit having a tip configured to bore a hole through a wall of the container, such as an oil filter casing or a tank wall, and a threaded frustoconically-shaped shank configured to engage the wall material defining the hole and to draw the tool into sealing engagement with the wall. A valve assembly is attached to the tip remote end of the modified bit. The valve assembly includes a hex-shaped surface for engaging a drill socket so that the tool can be rotated as it is pressed against the wall. A passageway extends through the shank for communicating fluid from the container, and a valve is located in the valve assembly in communication with the passageway to control fluid flow through the passageway. A cap fits over the valve assembly at the tip remote end of the tool during non-use and when the tool is being used to bore through the wall to protect the tool. The method includes providing the above noted tool, boring a hole in the wall, and removing fluid from the container and/or adding fluid to the container.

21 Claims, 3 Drawing Sheets

U.S. PATENT DOCUMENTS

| | | | |
|---|---|---|---|
| 4,452,695 | 6/1984 | Schmidt | 123/196 A |
| 4,540,011 | 9/1985 | Croxford et al. | 137/318 |
| 4,672,932 | 6/1987 | Schmidt | 123/196 A |
| 4,676,281 | 6/1987 | Nord | 184/1.5 |
| 4,739,861 | 4/1988 | Desjardins | 184/1.5 |
| 4,776,431 | 10/1988 | Poling | 184/1.5 |
| 4,865,156 | 9/1989 | Poling | 184/1.5 |
| 4,951,721 | 8/1990 | Moore et al. | 141/331 |
| 4,951,784 | 8/1990 | Bedi | 184/1.5 |
| 5,044,334 | 9/1991 | Bedi | 184/1.5 |
| 5,053,122 | 10/1991 | Carr | 210/416.5 |
| 5,067,514 | 11/1991 | Leemput et al. | 210/416.5 |
| 5,070,831 | 12/1991 | Yunick | 123/196 A |
| 5,145,033 | 9/1992 | Bedi et al. | 184/1.5 |
| 5,154,775 | 10/1992 | Bedi | 184/1.5 |
| 5,209,198 | 5/1993 | Bedi | 184/1.5 |
| 5,249,608 | 10/1993 | Hua | 141/65 |
| 5,299,714 | 4/1994 | Kilgore | 222/81 |

TOOL AND METHOD FOR REMOVING FLUID FROM CONTAINER

BACKGROUND OF THE INVENTION

The present invention concerns a tool and method for removing fluid from a container, and more particularly concerns a self-tapping tool that can be used to both bore into a container and thereafter funnel fluid from the container substantially without spillage. For example, the tool and method are useful for tapping and removing waste oil from an oil filter of a vehicle, though the present invention is not limited to only this application.

Modern vehicles are adapted with generally conveniently located drain plugs to facilitate drainage of waste oil from the vehicle's engine. However, for a number of reasons, vehicle oil filters are not usually as conveniently located, and as a result oil is usually spilled when the oil filters are removed. In some applications, more than a gallon of oil may be spilled, such as on diesel engines where there are oil containing cooler lines that drain into the oil filter. The spillage of oil is aggravated by the non-vertical orientation of many of the oil filters, and also the close quarters of the oil filters in the engine compartments of the vehicles. Also, workers generally do not have the time nor the temperament to be extra careful when changing oil filters, particularly where the oil and the engine are still hot. Unfortunately, spilled oil not only is wasteful and messy, but also is an environmental hazard where significant amounts of the spilled waste oil accumulate. Also, oil spilled on parts of an engine or on a floor can be a fire or safety hazard. At the same time, it is inconvenient and inefficient to use drop cloths or catch basins to collect spilled oil.

Aside from vehicle oil filters, there is a larger need for a tool that can be used to simultaneously form a hole in a wall of the filled container and sealingly plug the hole, yet allow leak-free access to the contents of the container, such as to remove or add materials to the container. In U.S. Pat. No. 1,248,251, there is shown a faucet including a tip for drilling a hole in a container wall made of wood, and a shank for engaging the wooden container wall. However, the faucet is particularly adapted to bore into and engage wood, and is not adapted to bore and sealingly engage a thin walled container made of metal, plastic or other structural material. It is noted that thin walled containers are particularly difficult to bore into and engage in a leak-free manner due to the limited thickness of the container wall. In particular, the faucet has nothing to do with a method or tool adapted to bore into and sealingly engage a thin walled casing of an oil filter.

Thus, a tool and method solving the aforementioned problems are desired.

SUMMARY OF THE INVENTION

In one aspect, the present invention includes a tool for accessing fluid in a container and removing fluid from the container. The tool includes a tip configured to form a hole in a wall of the container, and a shank connected to the tip including an exterior surface configured to frictionally and sealingly engage the material defining the hole. An annular surface on the shank extends radially from the exterior surface and is configured to sealingly engage the wall at a location spaced radially from the hole once the shank has been inserted into the wall to prevent leakage of the fluid from the container. The shank includes a trailing end configured to be sealingly engaged by a fluid collection device, and defines a passageway that extends from the tip to the trailing end for funneling fluid from the container after installation of the tool in the container. In a preferred form, a valve assembly is connected to the trailing end of the shank to control the flow of fluid through the passageway.

In another aspect, a method of removing fluid from a container including a thin wall is provided. The method includes providing a tool configured to form a hole in the wall and sealingly engage an exterior surface of the wall. The tool includes material defining a longitudinally extending passageway. The method further includes manipulating the tool to form a hole in the wall and manipulating the tool so that the tool seals against the exterior surface of the wall and so that the passageway is in fluid communication with the fluid in the container. The method still further includes removing fluid from the container through the passageway in the tool.

These and other features and advantages of the present invention will be further understood and appreciated by those skilled in the art by reference to the following specification, claims and appended drawings.

DETAILED DESCRIPTION OF THE PREFERRED EMBODIMENT

Figure 3:
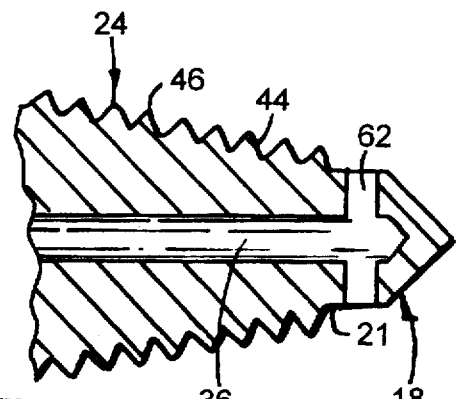
FIG. 3 is an enlarged cross-sectional view of the tip of the tool shown in FIG. 2.
Figure 4:
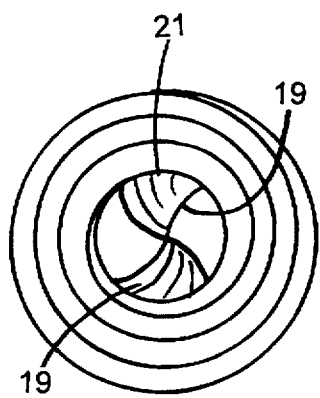
FIG. 4 is an end view of the tip shown in FIG. 3.

It is to be understood that the present invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A tool 10 (FIG. 1) embodying the present invention is provided for tapping a container 14 to remove fluid 12 from the container 14. The tool 10 includes a modified bit 16 having a tip 18 configured to bore a hole 20 through a wall 22 of the container 14, such as an oil filter casing or a container wall, and a threaded frustoconically-shaped shank 24 configured to engage the marginal wall material 26 forming hole 20 and configured to draw the tool 10 into sealing engagement with the marginal wall material 26. A valve assembly 28 is attached to the tip remote end 30 of the modified bit 16. The valve assembly 28 includes a hex-shaped surface 32 for engaging a drill socket 34 so that the tool 10 can be rotated as it is pressed against the container wall 22. A passageway 36 (FIG. 2) extends through the shank 24 for communicating fluid 12 from the container 14, and a valve piston 76 is located in the valve assembly 28 in communication with the passageway 36 to control fluid flow through the passageway 36. A dust cap 40 fits over the valve assembly 28 at the tip remote end 42 of the tool 10 to keep dirt from entering the valve assembly 28 during non-use.

The present invention is contemplated to be particularly useful for removing oil from oil filters for internal combustion engines before removing the oil filter, thus eliminating the fear of spilling hot (or cool) oil when changing the oil filter. In oil filter casings, the container walls are relatively thin metal, and the container bottoms are generally accessible for receiving tool 10. Thus, the use of tool 10 provides a quick way of removing oil that could otherwise be spilled, while also meeting the requirements of speed and efficiency. However, it is also noted that the present invention can be used when handling hazardous materials, such as for accessing hazardous chemicals in drums, tanks, pipes or other containers. Also, the present invention is contemplated to be useful for handling messy or difficult-to-handle materials, such as for accessing containers of inks, dyes, paints and coating materials. Further, the apparatus and method of the present invention could be used any place where there is a need to safely access fluid and/or even a gas or vaporous material in a tank or container already filled with the fluid or gas/vaporous material, to add or remove material therein.

Modified bit tip 18 (FIG. 2) is shaped much like a drill bit, and includes flutes 19 configured to bore through the wall 22. Tip 18 including flutes 19 are configured to remove wall material and deposit the removed material on the outside of container 14 to avoid, depending on the container, dropping pieces of wall material 22 into container 14. A cylindrical section 21 extends from flutes 19 to shank 24. Modified bit shank 24 includes a frustoconically-shaped outer surface 44 having threads 46 extending from tip 18 to a landing area 48. An annular surface 50 is formed on tip remote trailing end 30 adjacent landing area 48. A ring-shaped spacer 52 is press-fit onto landing area 48. Spacer 52 includes a trailing end 54 configured to sealingly engage annular surface 50, and a leading end 56 shaped to sealingly engage the marginal wall material 26 on container 14. Optionally, an "O" ring or flat seal (not shown) can be used on trailing end 54 or on leading end 56 to promote sealing engagement if desired.

The outer sealing surface 57 on the leading end 56 of spacer 52 is spaced radially from the center line 60 of tool 10 and from threads 46 so that it engages wall 22 on a minimally disrupted, substantially undistorted surface. Surface 58 on leading end 56 (FIG. 5) is further concavely/frustoconically-shaped. This forms a pocket for receiving the material 59 that forms around hole 20 as tool 10 is drawn through container wall 22. Notably, threads 46 (FIG. 3) have slightly rounded peaks and valleys to promote working, flowing, deforming and sealing against the wall material 59 around hole 20, and to help reduce shearing, tearing and splitting the wall material 59 around hole 20. Also, threads 46 have a depth of about 0.040 inches, which provides a good pull-in force on a thin walled container, such as a vehicle oil filter casing, to draw tool 10 into the container 14. Tip remote end 30 of modified bit 16 is enlarged and includes internal threads 64 configured to mateably receive valve assembly 28.

Passageway 36 extends axially along the center line 60 from tip remote end 30 through shank 24 to tip 18. A pair of opposing inlet holes 62 extend laterally through cylindrical tip section 21 at the juncture of tip 18 and shank 24 into the leading end of passageway 36. The trailing end of passageway 36 is enlarged and includes the female threads 64.

Figure 1:
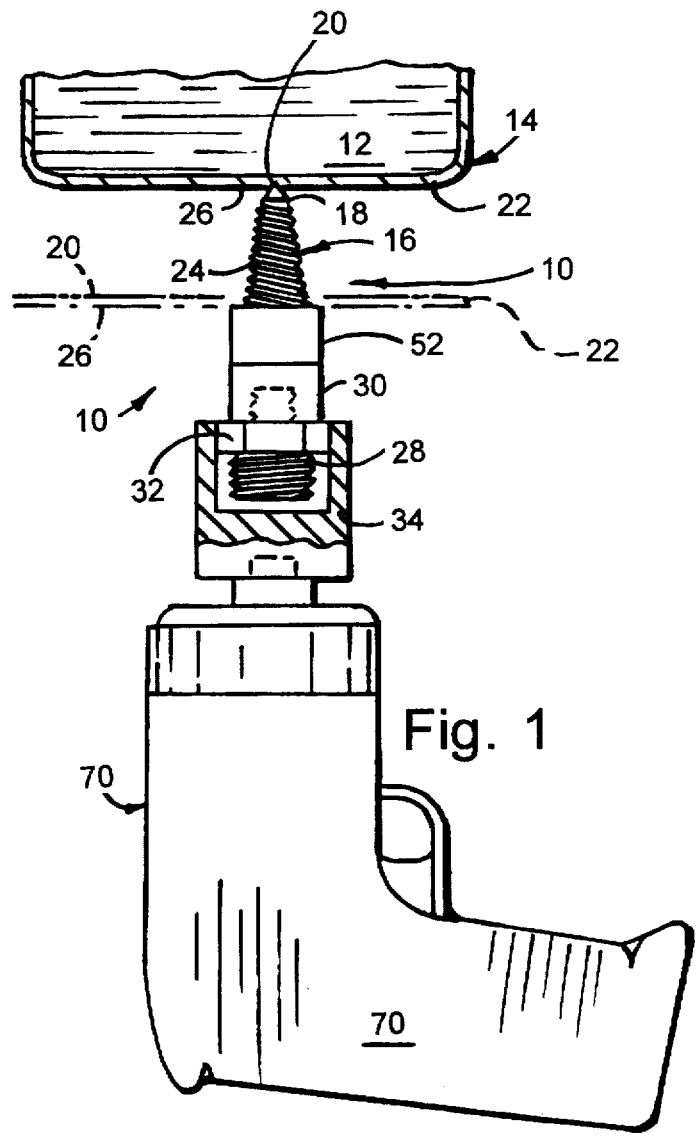
FIG. 1 is a side view of a tool embodying the present invention pressed against a wall of an oil filter casing/container by a drill.
Figure 2:
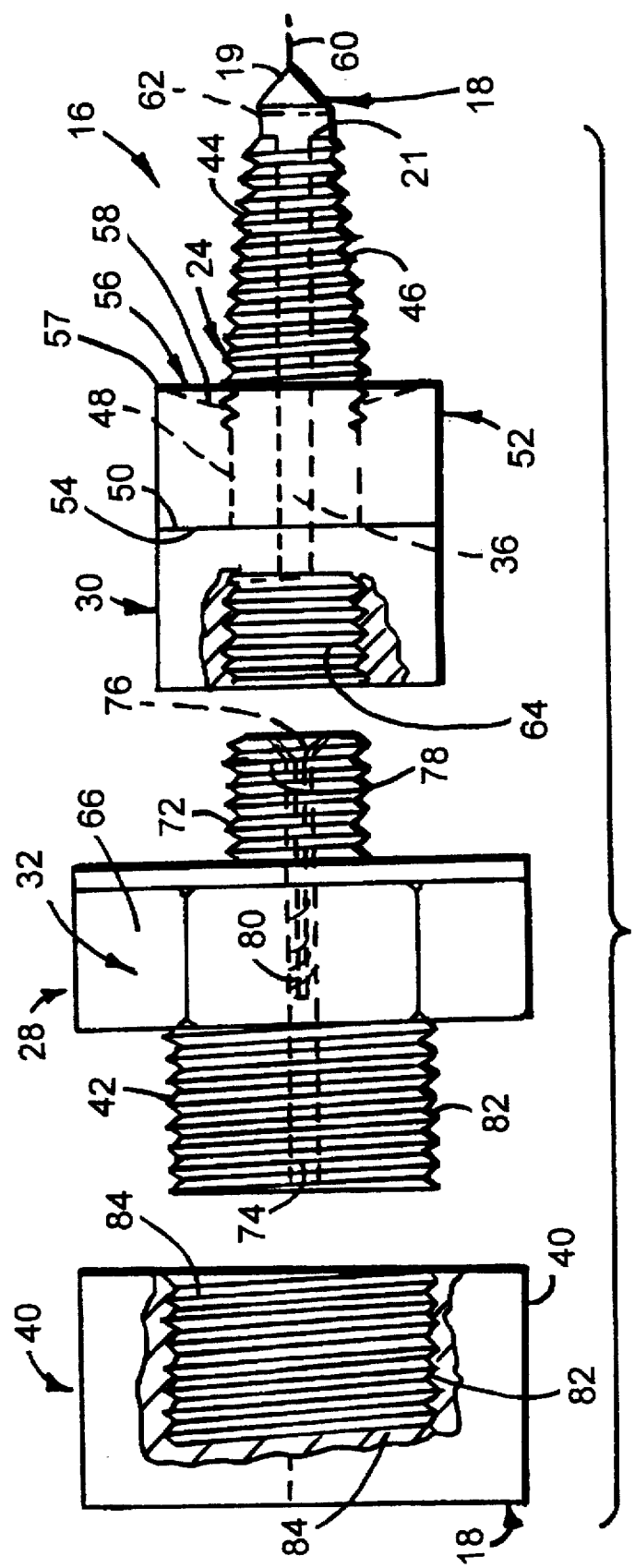
FIG. 2 is a partially exploded side view of the tool shown in FIG. 1.

Valve assembly 28 (FIG. 2) includes a body 66 having the hex-shaped flange 32 with flat side surfaces configured for engagement by the socket 34 mounted on a drill 70 (FIG. 1). A protrusion 72 (FIG. 2) extends from body 66 and is threaded for engaging the female threads 64 on modified bit 16. Valve piston 76 is operably mounted in a passageway 74 that extends through valve body 66. Valve piston 76 includes an enlarged valve end 76 for sealingly engaging seat 78 on body 66, and a spring 80 is configured to bias valve end 76 into sealing engagement with seat 78 in a normally closed position. The trailing end of valve body 66 includes male threads 82. The dust cap 40 is cup-shaped and includes female threads 84 for engaging male threads 82. With cap 40 installed, valve assembly 28 is protected, so that dirt and debris does not enter the passageway 74 defined in valve assembly 28. Also, cap 40 can be used to protect tool 10 after the tool 10 is installed in a wall 22 where it is desirable to leave the tool 10 in the wall for later access.

Figure 6:
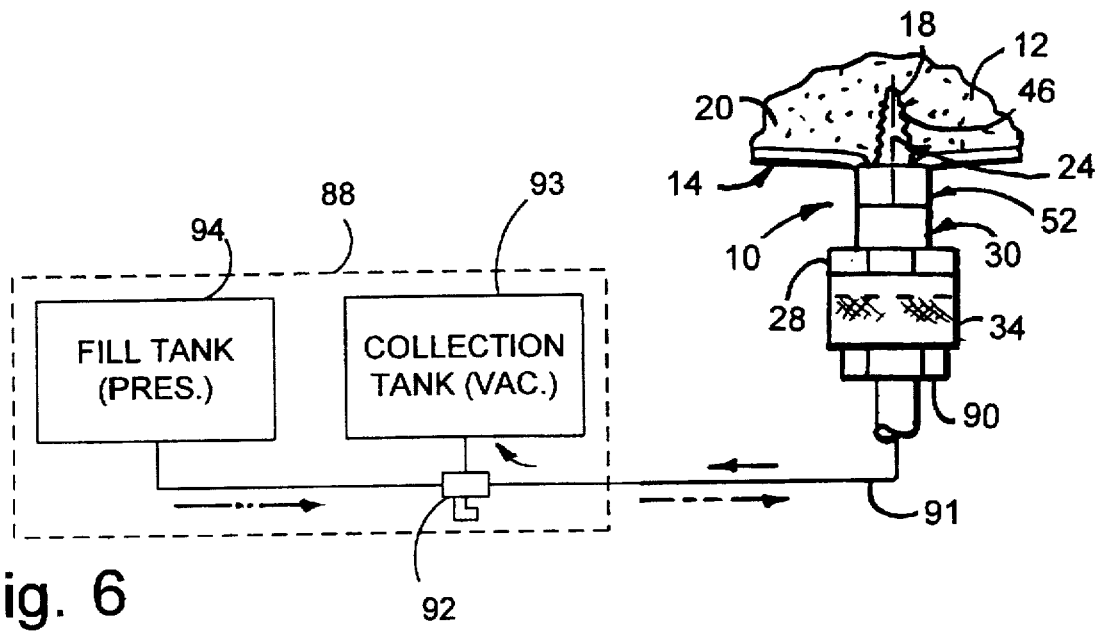
FIG. 6 is a side view of the tool shown in FIG. 1 installed in a container wall and connected to a collection device.

With cap 40 removed, valve assembly 28 can be releasably engaged by a fluid collection unit 88 (FIG. 6). Specifically, unit 88 includes a connector 90 that attaches to valve assembly 28 and opens valve piston 76. Connector 90 is female threaded to mateably engage male threads 82 on valve assembly 28, but it is noted that the connection could also be made by a quick disconnect arrangement such as is often used in hydraulic lines. A fluid line 91 extends from connector 90 to a direction control valve 92. A collector tank 93 for collecting waste oil is operably connected to valve 92. A vacuum in the atmosphere of tank 93 automatically draws the waste oil 12 from container 14 when valve 92 is switched to the "vacuum" or drain position. Alternatively, the waste fluid can be allowed to drain from the container under its own gravitational weight or allowed to drain under a container-atmosphere-generated force.

It is contemplated that unit 88 will also include the capability of adding fluid through tool 10. For this purpose, unit 88 also includes a tank 94 of fresh fluid under pressure which can be actuated by moving valve 92 to a "fill" position. However, where the container 14 is a disposable oil filter, this second tank 94 would not be required.

Figure 5:
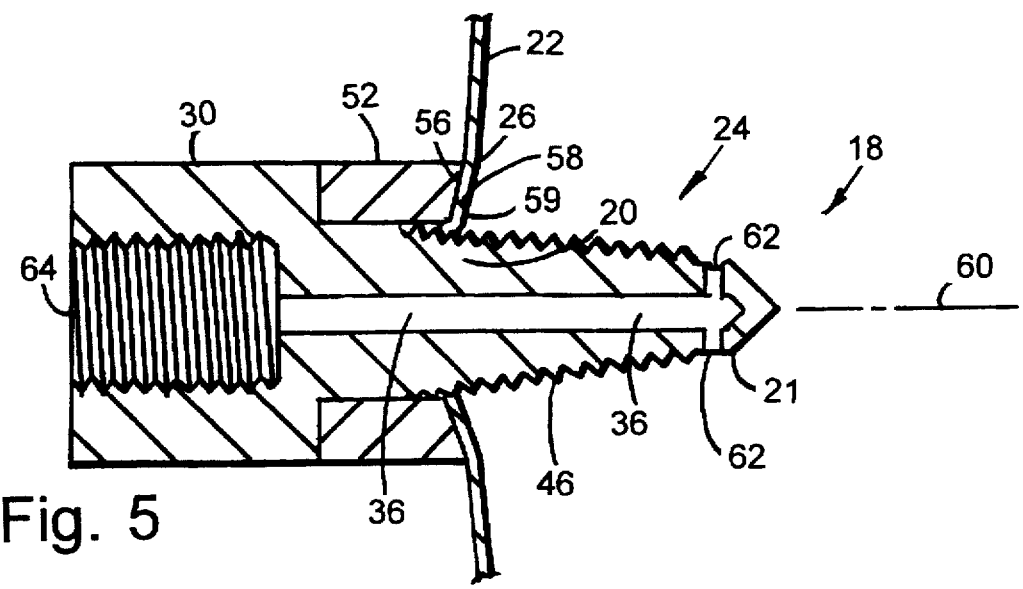
FIG. 5 is an enlarged cross-sectional view of the shank of the tool including that portion which sealingly engages the container wall.
Figure 7:
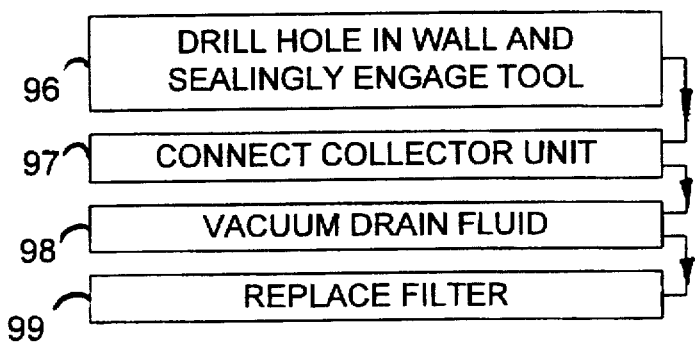
FIG. 7 is a flow chart illustrating a method of using the tool.

A method of utilizing the tool to remove fluid from a container is generally illustrated by the flow chart in FIG. 7. The method includes providing the tool 10 which is configured with a bit section or tip 18 to form the hole 20 in the container wall 22. The tool 10 is attached to a drill mounted socket 34, and rotated by the drill 70. As the tool 10 is pressed against the container wall 22 and rotated (step 96), it forms the hole 20 in wall 22 (FIGS. 1 and 7). Once hole 20 is formed, threads 46 on tool 10 draw tool 10 into container 14. As tool 10 enters container 14, it sealingly engages the marginal wall material 26 (FIGS. 5-7). Notably, the threads 46 are located on the frustoconically-shaped outer surface 44 of tool 10, which frustoconically-shaped outer surface 44 displaces the marginal wall material 26 as tool 10 is extended into container 10 to further promote a leak-free connection. Once tool 10 is fully inserted, a passageway 36 in tool 10 is in fluid communication with the fluid 12 in the container 14. Collection unit 88 is then connected to the valve assembly 28 on tool 10 (step 97) and actuated (step 98) to remove fluid 12 through passageway 36. Preferably, the step of draining is accelerated by using vacuum to motivate the fluid removal through drain line 91. Filter 14 is then replaced (step 99). Optionally, replacement fluid can be passed through passageway 36 back into container 14 if desired.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A removable drill tool for removing fluid from a container through a container wall without spilling the fluid, comprising:

a drill bit section configured to drill and thus form a hole in the wall as the tool is rotated, the bit section including a cylindrically shaped portion at a rear thereof;

a frustoconically-shaped threaded shank section shaped to sealingly engage and work the wall material to enlarge the hole once it is formed by the drill bit section, said threaded shank section including an exterior surface configured to hold the tool in the container and to seal against the wall material as it is worked and further including an internal passageway defined in said tool for removing fluid from the container after the tool has been fully turned into the container wall, said passageway including a radially extending portion in said cylindrically shaped portion of said bit section, and further including a longitudinally extending portion in said threaded shank section; and a bit remote section including a valve assembly for preventing fluid from passing through said internal passageway as said tool is rotated to form said hole, said bit remote section being configured for operable connection to a fluid collection device, said bit remote section being configured to place said fluid collection device in fluid communication with said internal passageway at a time when the tool has been fully inserted into the container and when said valve assembly has been opened, and including sealing means adjacent the threaded shank section for sealing against the container wall material after the tool has been fully inserted into the container.

2. A tool as defined in claim 1 wherein said bit remote section is configured for frictional engagement by a drill.

3. A tool as defined in claim 1 including a spacer matingly engaging a portion of said frustoconically-shaped section, said spacer having a concavely shaped sealing surface configured to cooperate with said frustoconically-shaped section to sealingly engage the marginal wall material forming the hole.

4. A tool as defined in claim 1 including a hex-shaped flange connected to said shank section that is configured for engagement by a socket.

5. A tool as defined in claim 1 wherein said shank section includes a ring-shaped flange having a concave sealing surface configured to seal against the material forming the wall.

6. A tool as defined in claim 1 wherein the fluid container is an oil filter having a thin metal casing forming said wall, and said tool is configured to bore the hole and sealingly engage the casing in a leak-free manner.

7. A removable drill tool for accessing fluid in a thin-walled container having a wall, comprising:

a modified drill bit including a shank and a tip supported on a leading end of the shank, said tip including opposing flutes configured to drill a hole in the wall as the bit is rotated and further including a cylindrically shaped portion at a rear thereof, the shank including a frustoconically-shaped exterior surface for sealingly engaging the wall and expanding the hole as the shank is extended through the wall, and further including threads on the frustoconically-shaped exterior surface for engaging the wall as the bit is further rotated to positively draw the wall onto the shank, and still further including an internal passageway extending from the leading end to a trailing end of the shank for communicating with the fluid in the container once the bit is extended into the container, said passageway including a radially extending portion in the cylindrically shaped portion of said tip and including a longitudinally extending portion in said shank; and a bit remote section including a valve assembly for preventing fluid from passing through said internal passageway as said tool is rotated to form said hole, said bit remote section being configured for operable connection to a fluid collection device, said bit remote section being configured to place said fluid collection device in fluid communication with said internal passageway at a time when the tool has been fully inserted into the container and when said valve assembly has been opened, and including sealing means adjacent the threaded shank section for sealing against the container wall material after the tool has been fully inserted into the container.

8. The tool defined in claim 7 including a sealing member on the trailing end of the shank for sealingly engaging the marginal material of the container wall forming the hole once the bit is fully extended into the container.

9. The tool defined in claim 8 wherein the sealing member includes an annular sealing surface that extends from the exterior surface of the shank.

10. The tool defined in claim 9 wherein the sealing surface is concavely shaped in cross section.

11. The tool defined in claim 10 wherein the sealing surface is concavely, frustoconically shaped.

12. The tool defined in claim 7 including a valve attached to the bit and in communication with the passageway.

13. The tool defined in claim 12 wherein the valve includes a body having a threaded section for threadably engaging a corresponding threaded section on the trailing end of the bit.

14. The tool defined in claim 7 wherein the radially extending section has an open end located at a junction of the shank and the tip.

15. The tool defined in claim 14 wherein the open end is located at the leading end of the shank.

16. The tool defined in claim 7 including a body attached to the trailing end of the bit, the body including a geometrically-shaped exterior surface configured to mateably releasably engage a socket of a hand-held drill, the geometrically-shaped member and the bit forming a compact arrangement that can be manipulated as a unit with the drill while only holding onto the drill when drilling the hole for ease of operation and for safety.

17. The tool defined in claim 16 wherein the geometrically-shaped exterior surface is hex shaped.

18. A removable drill tool for drilling a hole in a vehicle oil filter casing to access and remove oil in the casing, comprising:

a modified bit including a shank and a drill-tip supported on a leading end of the shank configured to drill a hole in the wall as the bit is rotated, the shank including a frustoconically-shaped exterior surface for sealingly engaging the wall and expanding the hole as the shank is extended through the wall, and further including threads on the frustoconically-shaped exterior surface for engaging the wall as the bit is further rotated to positively draw the wall onto the shank, and still further including a passageway extending from the leading and to a trailing end of the shank for communicating with the fluid in the container once the bit is extended into the container, said passageway including a radially extending portion in said tip and a longitudinally extending portion in said shank;

a sealing member on the trailing end of the shank for sealingly engaging the marginal material of the container wall forming the hole once the bit is fully extended into the container, the sealing member including an annular sealing surface that extends from the exterior surface of the shank, the sealing surface being concavely shaped in cross section;

a body attached to the trailing end of the bit, the body including a geometrically-shaped exterior surface configured to mateably releasably engage a socket of a hand-held drill, the geometrically-shaped member and the bit forming a compact arrangement that can be manipulated as a unit with the drill while only holding onto the drill when drilling the hole for ease of operation and for safety; and a valve attached to the bit and in communication with the passageway for preventing fluid from passing through said internal passageway as said tool is rotated to form said hole, said modified bit being configured to place a fluid collection device in fluid communication with said internal passageway at a time when the tool has been fully inserted into the container and when said valve assembly has been opened.

19. A removable drill tool for accessing fluid in a thin-walled container having a wall, comprising:

a modified bit including a shank and a tip supported on a leading end of the shank configured to pierce a hole in the wall, the shank including a frustoconically-shaped exterior surface for sealingly engaging the wall and expanding the hole as the shank is extended through the wall, and further including threads on the frustoconically-shaped exterior surface for engaging the wall as the bit is further rotated to positively draw the wall onto the shank, and still further including a passageway extending from the leading and to a trailing end of the shank for communicating with the fluid in the container once the bit is extended into the container, said passageway including a radially extending portion in said tip and a longitudinally extending portion in said shank;

a sealing member on the trailing end of the shank for sealingly engaging the marginal material of the container wall forming the hole once the bit is fully extended into the container, the sealing member including an annular sealing surface that extends from the exterior surface of the shank, the sealing surface being concavely shaped in cross section such that the threads draw the marginal material into sealing engagement with the concavely shaped sealing surface of the sealing member; and a valve operable attached to the bit and in communication with the passageway for preventing fluid from passing through said internal passageway as said tool is rotated to form said hole, said modified bit being configured to place a fluid collection device in fluid communication with said internal passageway at a time when the tool has been fully inserted into the container and when said valve assembly has been opened.

20. A method of accessing fluid in a thin-walled container having a wall comprising deformable material without substantial leakage, comprising step of:

providing a tool including a modified drill having a tip configured to rotatably drill a hole in the wall of the thin-walled container, a frustoconically-shaped, externally-threaded shank, and a trailing end section defining an annular sealing surface, said passageway including a radially extending portion in said tip and a longitudinally extending portion in said shank, said trailing end section including a valve to present fluid from passing through the internal passageway as said tool is rotated to form said hole;

rotating the tool while pressing the tool against the wall of the thin-walled container to first drill a hole in the wall and thereafter cause threads on the shank to engage the marginal material of the wall forming the hole so that the threads draw the marginal material along the shank against the sealing surface and so that the frustoconically-shaped externally-threaded shank continuously, slidingly, sealingly engages the marginal material while expanding the size of the hole; and removing fluid from the container to a fluid collection device at a time when the tool has been fully inserted into the container and when said valve has been opened.

21. The method defined in claim 20 including steps of releasably attaching the tool to a hand drill by engaging the trailing end section with a socket on the hand drill, manipulating the hand drill and tool as a unit including the step of rotating, and thereafter removing the drill from the tool and connecting a collecting device to the tool.

* * * * *